July 14, 1936.   C. E. MALLORY   2,047,423
APPARATUS FOR CLOSING CANS
Filed Nov. 6, 1933   5 Sheets-Sheet 1

Charles Earl Mallory
INVENTOR.

WITNESS—

BY
ATTORNEY.

July 14, 1936.　　　　C. E. MALLORY　　　　2,047,423
APPARATUS FOR CLOSING CANS
Filed Nov. 6, 1933　　　5 Sheets-Sheet 4

WITNESS-
Wm. C. Meiser

Charles Earl Mallory
INVENTOR.

BY Tony W. Johns
ATTORNEY.

Patented July 14, 1936

2,047,423

UNITED STATES PATENT OFFICE 2,047,423

APPARATUS FOR CLOSING CANS

Charles Earl Mallory, Saladillo, Rosario de Santa Fe, Argentina, assignor to Swift and Company, Chicago, Ill., a corporation of Illinois Application November 6, 1933, Serial No. 696,902
In Argentina April 14, 1932

16 Claims. (Cl. 113—82)

This application is a continuation in part of and when filed is to forthwith take the place of pending application Serial No. 621,907 filed by me on July 11, 1932, for invention entitled "Improvements in apparatus for closing cans."

The invention according to a broad aspect thereof relates to improvements in can closing apparatus whereby the closing and sealing of cans is carried out in a vacuum chamber automatically and continuously by simple mechanical means.

The invention according to another aspect thereof relates to improvements in apparatus for closing double-seamed cans and more particularly to an improved vacuum closing device, adapted for use, for instance, with machines such as the Max Ams Double Seamer, Model 1445 T, in connection with which the device in accordance with this invention has been illustrated.

An object of the present invention is to provide a simple means for effecting a practically complete removal of air from cans and their contents and for thoroughly sealing the cans thereafter without the necessity of various chambers and various rotating conveying means.

Another object is to provide means in a double-seaming machine for extracting air from can and contents while the can cover is entirely separate from the can body.

A further object is to provide means in a double-seaming machine for extracting air from can and contents during the time in which the previous can is under the process of double-seaming and passing, in a continuously operating machine.

A further object is to provide means in a double-seaming machine for extracting air from can and contents at a desired high temperature without losing or withdrawing any of the contents, which so often happens when said can is filled with a greasy or fatty product such as meat, when not in a somewhat chilled condition.

A further object is to eliminate the necessity of passing the filled cans through a series of two or more chambers or machines thereby increasing the number of moving parts or apparatus to accomplish a means of sealing cans under vacuum, and especially rectangular cans.

A further object is to eliminate the necessity of providing a hole in the can through which air is extracted from the can and contents, and the solder necessary to seal said opening.

A further object is to eliminate the necessity of providing and installing a so-called "bridge" or "cleat" on each can cover, the function of which is to facilitate the extraction of air through a small hole when the can is filled with a greasy or oily product such as meat at a warm temperature.

A further object is to economize floor space and equipment and lessen labor by providing a simple means to accomplish, in one machine, the desired results, which heretofore have required various apparatus and cooling means, when a greasy or oily product such as warm meat is sealed in a can under vacuum.

Further objects will appear as the specification proceeds.

With these and other objects in view, the invention consists in the construction and novel combination and arangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In order to facilitate the understanding of this invention the same has been shown by way of example in the accompanying drawings which constitute a part of this specification. In said drawings one form of the invention, as has been previously indicated, is illustrated as applied to a well known make of double-seamer for rectangular cans, to-wit, the Max Ams Double Seamer, Model 1445 T, but it will be understood that by modifying certain details within the scope of this invention the improved vacuum closing device may be readily embodied in other forms and that the improved vacuum closing device may be readily applied or adapted to other known constructions of can closing machines.

It is a well known fact that when a greasy or oily product such as meat is sealed in a can under vacuum by extracting the air through a small hole in the can, considerable trouble is experienced in sealing same due to the efflux of oil and grease. An extra operation of cooling the product and the addition of a baffle under the small opening, commonly known as a "bridge" or "cleat" help to overcome the difficulty of sealing by this method.

This invention, therefore, primarily resides in the combination of a vacuum chamber, with a double-seaming device inclosed in the vacuum chamber, simple means for automatically delivering and discharging the cans to and from the sealing mechanism through the walls of the vacuum chamber, as by a single can receiving turret, means for centering and holding the cans in position during the process of double-seaming and means for maintaining a constant vacuum in the chamber.

An important feature of the vacuum chamber construction revolves about the employment of a vertical yieldable air sealing plate that is interposed between the lower end portion of a front hood of the vacuum chamber construction and that portion of the turret which is in the immediate vicinity of but below the hood. Said sealing plate is preferably spring pressed downwardly against the top surface of the turret and as the name thereof implies provides and maintains an air-tight seal as between the plate and the turret while at the same time permitting the turret or rather the can receiving sections of the turret to move along a horizontal but circular path below the sealing plate.

This sealing plate is sufficiently large to cover enough of the turret to prevent any short circuiting of air through a can receiving section of the turret as the turret is revolved. Said sealing plate also has upwardly extending portions that engage and fit corresponding portions of the hood whereby an air-tight seal may be maintained between the sealing plate and the hood and while permitting slight vertical movement of the sealing plate incident to changes in temperature conditions or in other operating conditions as for example incident to slight variations in the turret top surface, to-wit, such variations or changes as result from wear.

In said drawings:

Fig. 5 is a plan view of the machine partially in section thus more clearly showing the turret and sealing plate that rests upon the turret. This Fig. 5 is a view taken as on the horizontal planes indicated by the lines 5—5 of Fig. 1.

Fig. 6ª is a vertical sectional view taken as on the plane indicated by the line 6ª—6ª in Fig. 6.

Fig. 7ª is a vertical sectional view taken as on the plane indicated by the line 7ª—7ª, showing the U-iron secured to turret 4.

Fig. 10ª is a vertical view of the same side chamber closing piece and it will be noted that the curved face thereof has a vertical dimension the same as that of the turret and is shaped so as to conform to or fit with the curved face of the turret.

Fig. 12ª is a horizontal sectional view taken as on the plane indicated by the line 12ª—12ª of Fig. 12.

Fig. 14 is a detail in elevation showing the operation of bar 64.

It will here be stated that the general function of the double-seaming machine, hereto used to describe the improvements heretofore mentioned, is to automatically double-seam tops into rectangular tapered cans after they have been filled with some prepared product and this without the employment of any means of extracting air from said cans or contents other than the means employed for establishing and maintaining the vacuum in the vacuum chamber wherein the double-seaming is effected or carried out.

Figures 5, 14:
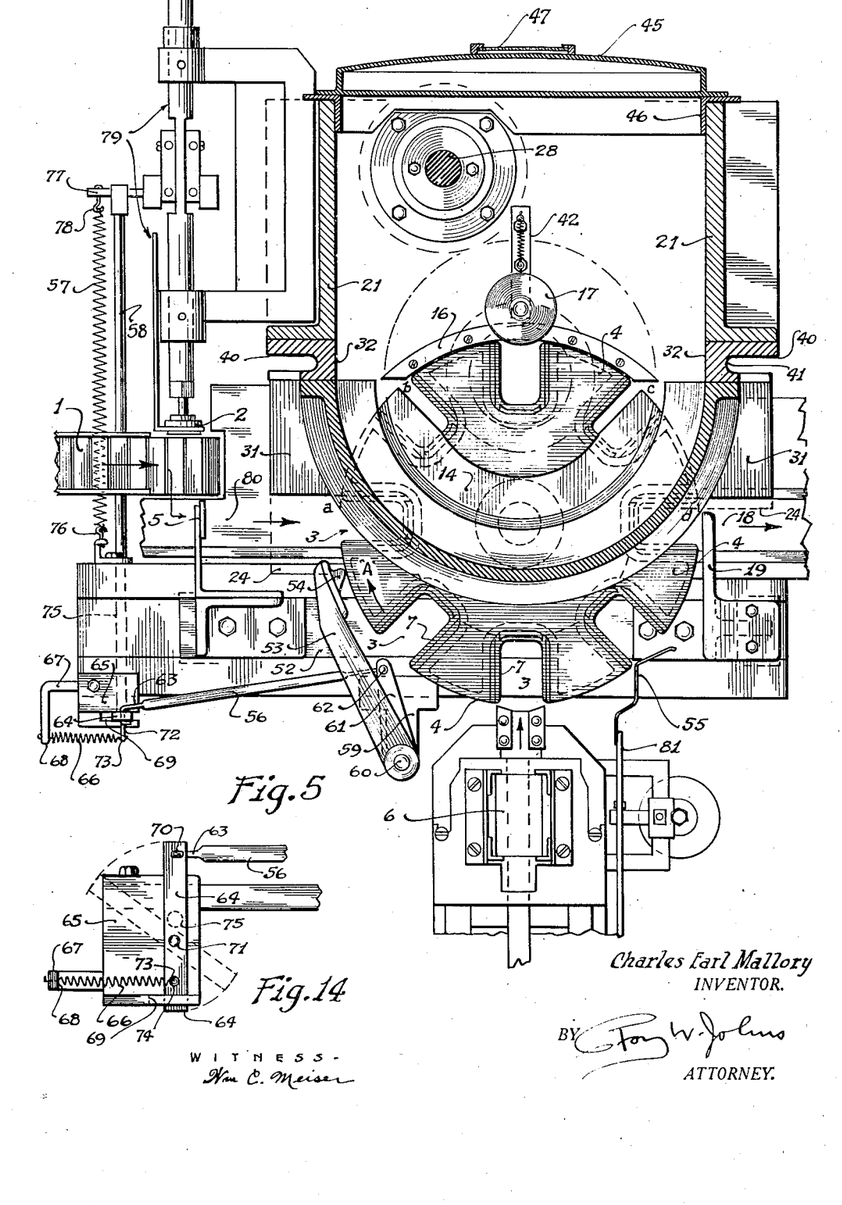

The operation of such machine is as follows. Referring to Fig. 5 it will be seen how the filled cans enter on conveyor chain 1 from which they are regularly pushed one at a time by pushing bar 2 into position to be fed into can receiving pocket 3 of turret 4 through the medium of pushing arm 5.

Figure 6:
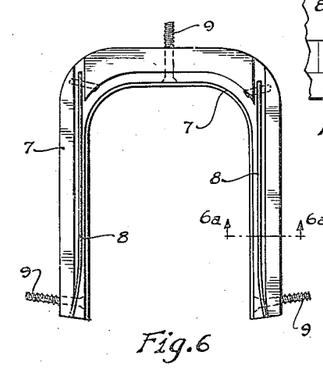
Fig. 6 is a plan view of a removable U-iron, used for supporting the top of the can, before introduction to the turret preparatory to its use in the capping, seaming and sealing operation.

The pushing bar 2 and the pushing arm 5 are operated in timed relationship with the step by step positioning of the turret 4. The tops for the cans are also fed in the proper timed relationship from magazine 6 into U-irons 7 (see Figs. 6 and 7) containing two flat springs 8 for supporting said tops until brought into contact with the can body just before the double seaming action. An inspection of Fig. 5 will show that these can tops pass from the magazine to the springs 8 of the U-irons 7 while the can receiving pocket 3 corresponding thereto is exposed to the atmosphere or in other words is out of the vacuum chamber. In the construction as shown two step by step movements of the turret in the direction of the arrow A bring the can top to the position at which the can with which it is to be used is introduced into the turret through the medium of the pushing arm 5.

Figures 6A, 7:
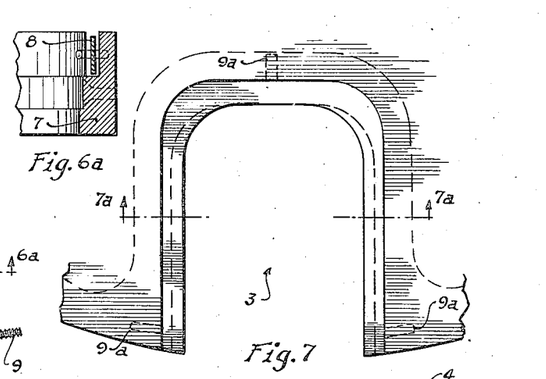
Fig. 7 is a plan view of a section of the turret showing the location of the U-iron, ledge and pocket.

The U-irons 7 are secured to the side walls of pockets 3 at holes 9ª by means of small screws 9 and it will be here remarked that the turret 4 is made hollow for the sake of lightness.

The turret 4 turns in step by step movement about the vertically extending axis of the drive shaft 10 therefor whereby the can tops are successively brought over the place where a can to be capped and sealed is caused to enter the pocket 3 all as previously indicated and in place under the cap. The step by step movement of the turret ultimately brings each can and its associated cap directly under the double-seaming mechanism collectively referred to as SM in Fig. 1, to-wit to a position whereat a pusher 11 can raise the can whereby the cap will be caused to enter the top of the can as the result of the cap striking a chuck or resisting member 12 of the double-seaming mechanism.

Figures 1, 2:
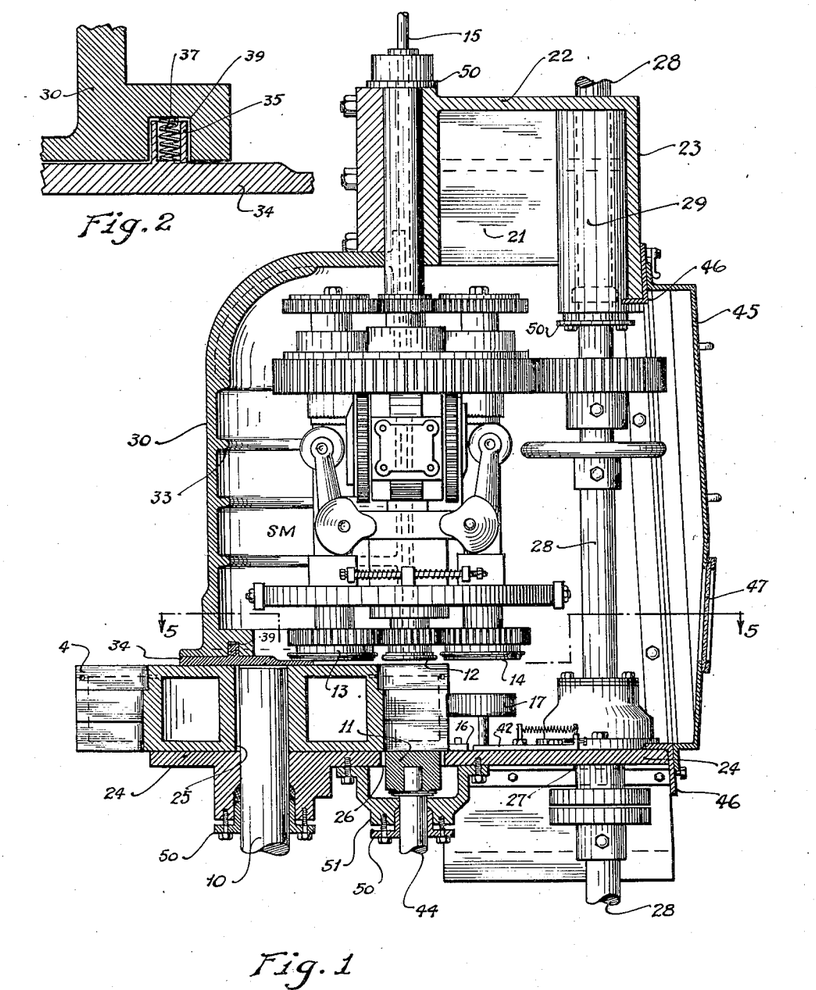
Figure 1 is a side elevation partly in section of a double-seaming machine for rectangular cans in which this invention is embodied or in conjunction with which the invention is illustrated so as to show the manner in which it is applied.
Fig. 2 is a partial vertical sectional view showing in detail the sliding connection existing at the lower portion of the front hood and a section of the sealing plate.
Figure 3:
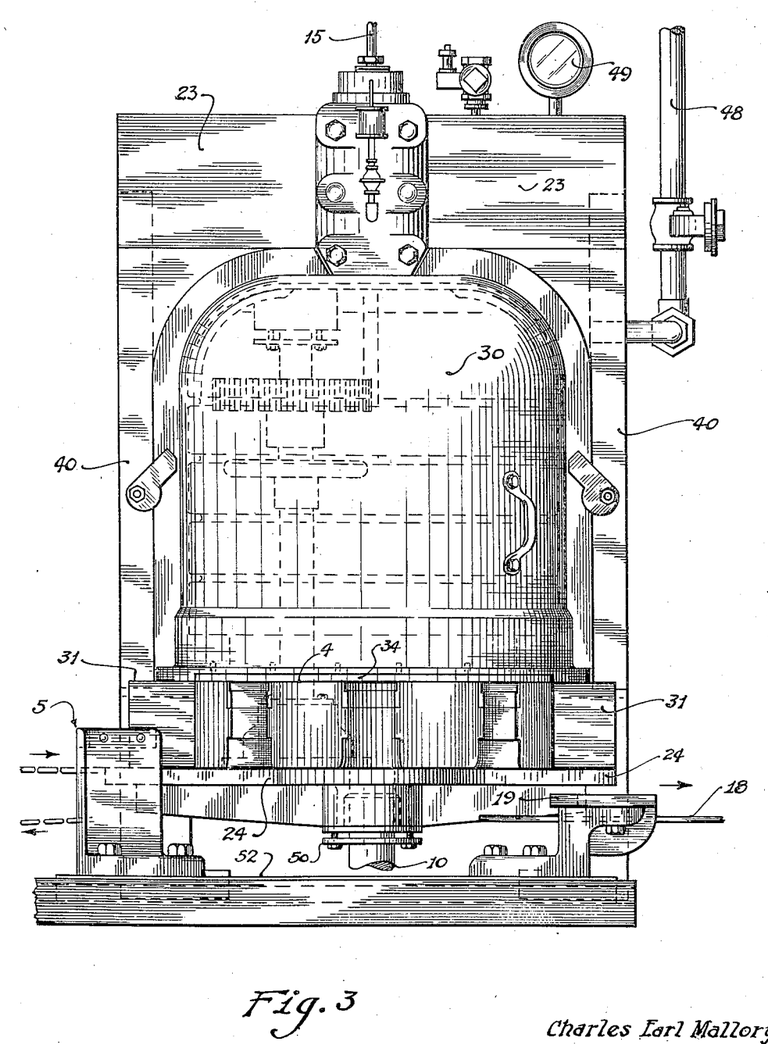
Fig. 3 is a front elevation showing the invention as embodied in or applied to the machine.
Figure 4:
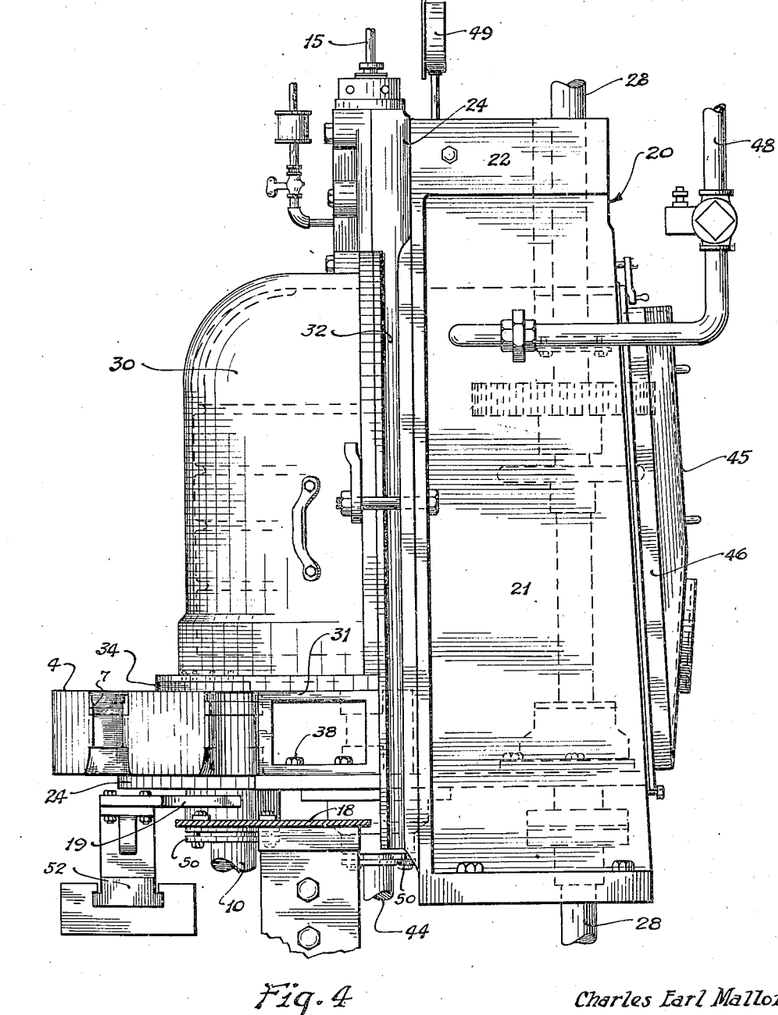
Fig. 4 is a side elevation.

The double-seaming mechanism SM includes seaming rollers 13 and 14 each of which has an orbit of revolution about the chuck 12. The chuck 12 is stationary and the seaming rollers 13 and 14 are cooperatively related therewith so as to effect the double-seaming operation while an assembled can and top are being held in the upper position against the chuck 12 by means of the pusher 11. The seaming mechanism also includes an intermittently operating push rod 15, the lower end of which extends through the central portion of the stationary chuck 12 and which push rod 15 is periodically moved downwardly for insuring a lowering or dropping of the capped and seamed can from the chuck 12 upon the completion of the seaming operation.

In the double seamer there is employed a stop 16—namely the circular shaped strip 16 (see Figs. 5 and 1)—which is provided to prevent the cans from flying out of the can receiving pockets of the turret due to centrifugal force as the turret moves from one position to the next. In the machine there is also provided a pressing roller 17 which is continuously spring pressed towards the turret for forcing each can coming under the chuck by forcing the can against the back of the pocket 3 for the double-seaming operation. The sides of the pocket 3 are so shaped that the cans are also centered in cross direction as they are raised.

It will be understood that the turret 4 is suitably operated through the drive shaft 10 which in turn is suitably operated as through the medium of a Geneva movement so as to be periodically positioned and held against movement for and during the seaming operation and whereby the required position of each pocket in respect to the chuck 12 is realized.

After the double-seaming operation has been carried out the capped and seamed can drops, or is pushed by rod 15, back into its lower position in the turret opening 3 corresponding thereto. Thereafter the turret by its step by step movement passes the capped and seamed can to a position whereat it drops by gravity to a lower receiving plate 18 and from which it is pushed out by an ejecting arm 19. It will be seen from an inspection of Fig. 5 that the place where the capped and seamed can leaves the vacuum chamber or turret is 180 degrees from the place where the can was passed into the turret preparatory to passing into and through the vacuum chamber.

The double-seaming machine has a suitable base plate and other frame members upon and by which the several coordinated operating elements of the double-seaming machine are mounted and supported in the necessary relationship whereby the machine can carry out the several functions necessary for and incident to the sealing operations including the proper feeding of the parts to be assembled prior to the double-seaming operation and of the discharge and delivery of the completely sealed can from the machine.

The revolving mechanism used to perform the double-seaming operation is somewhat complicated and since there have been no changes or additions to this part of the machine as regards the present invention it has been omitted from the drawings and specification. Likewise, since the feeding in mechanism and the ejecting mechanism and the other associated mechanisms are such as to exist in the commercial Max Ams machine referred to, detailed description thereof is deemed unnecessary herein. It is believed that the foregoing outlines however will form a good premise illustrative and descriptive in a general manner of the essential features of a machine in which the invention has been embodied or as otherwise expressed to which the invention has been adapted.

The following supplies a description of the essential characteristics and physical embodiments which it is advisable to realize and carry out in converting a non-vacuum type of double-seaming machine into a vacuum type of double-seaming machine. Substantially the same characteristics and physical construction should be borne in mind in producing de novo a vacuum type of double-seaming machine.

The double-seaming machine comprises the usual and suitable frame and includes an inverted U-shaped member 20 that provides spaced upright side members 21 connected at the upper ends thereof by the transverse portion 22. This member also has at the upper end thereof a transversely and vertically extending upper front and rear plate 23.

In constructing the vacuum type of machine I have had to design and make anew the base plate 24 and also the turret 4.

Figures 7A, 10, 10A:
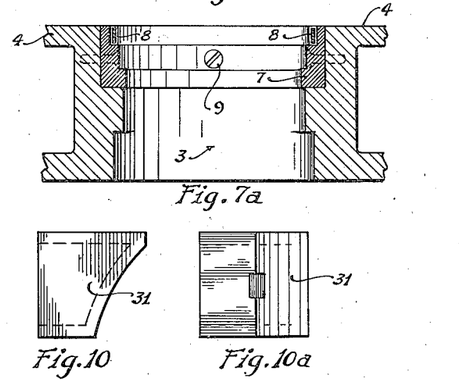
Fig. 10 is a plan view of one of the side chamber closing pieces.
Figures 12, 12A, 13:
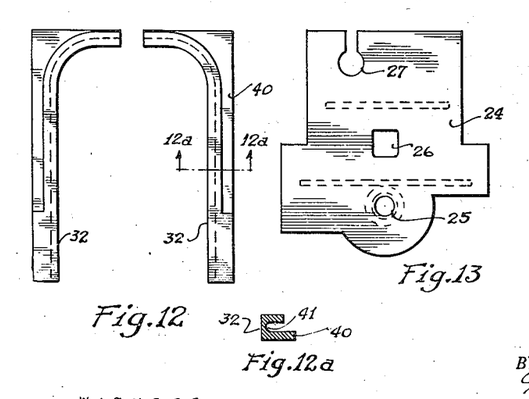
Fig. 12 is an elevational view showing the two side pieces or side strip plates employed in the supporting of the removable front or hood over the turret.
Fig. 13 is a plan view showing the base plate of the vacuum chamber and turret.

To the lower part of the frame member 20 there is rigidly connected the horizontally extending base plate 24 upon which the turret 4 rests. This base plate 24 is clearly shown in plan in Fig. 13 and it appears in section in Fig. 1. The base plate 24 has three main openings therethrough or therein, namely opening 25 through which the turret drive shaft 10 passes (see Figs. 1 and 13), opening 26 that receives pusher 11 (see Figs. 1 and 13), and opening 27 through which another main drive shaft 28 passes (see Figs. 1, 4, 5 and 13). The main drive shaft 28 drives gearing mechanism that in turn actuates the several elements of the double-seaming mechanism SM. The upper end of this shaft 28 passes through and is supported in a bearing 29 provided on the transverse portion 22 of the U-shaped frame member 20. In the converting of the commercial seaming machine selected and referred to herein so that the required vacuum chamber is produced I have provided a rear hood or door 45 that extends from the base plate to the top transverse portion 23 of the inverted U-shaped frame member and also from one upright side member 21 to the other upright side member 21 of said frame member 20. I have also provided a front hood 30 and additional filling pieces or members as wall blocks 31 (see Figs. 10 and 10ᵃ), and vertically extending bearing strips, or side adapting strips as they may be termed, 32 (see Figs. 12 and 12ᵃ), whereby there is provided an air tight sealing construction that extends from the transverse extending upper member 23 to the top of the turret and past certain vertical edge portions of the turret to the base plate 24 on the one hand and from one vertical side member 21 to the other vertical side member 21 on the other hand.

Figure 8:
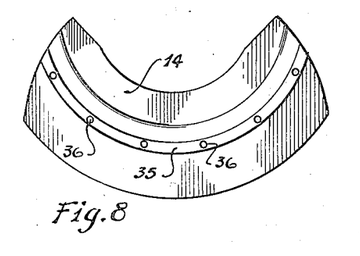
Fig. 8 is a plan view of the sealing plate, which sealing plate is preferably made of brass or other material suitable for resting with sliding engagement upon and against the turret of ferrous metal.
Figure 9:
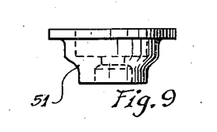
Fig. 9 is an elevational view of one of the sealing cups about an operating shaft; this view typifies the sealing construction as used about the several shafts or rods in the machine particularly at the place where said shafts or rods enter or emerge from the structure defining the vacuum chamber.

I have also provided certain sealing constructions at or for each place where a shaft or pusher passes from the exterior of the vacuum chamber into the vacuum chamber as for example into or through the openings 25, 26 and 27 in the base plate, at the opening for the bearing 29 at the upper end of shaft 28 and also at the opening where the upper end of the push rod 15 enters the upper portion of the frame. The front hood 30 is constructed and arranged so that the lower side portions thereof rest on two wall blocks 31 and the rear face portions of the hood rest against and engage the two vertically extending bearing or adapter strips 32, in this connection see Figs. 4, 5, 10, 10a, 12 and 12a. The front hood 30 is made of light weight metal and has been made thin for convenience in removing. The reinforcing ribs 33 make it sufficiently strong to withstand the atmospheric pressure. There is held in place by the lower part of the hood 30 a segmental shaped brass piece 34 constituting the sealing plate that is interposed between a lower portion of the hood and that part of the turret which is immediately below the hood. The sealing plate is shown in Fig. 8 and it appears in section in Figs. 1 and 2. It also appears quite prominently in Figs. 4 and 5. In the latter figure the outline thereof is designated by the lines ab—bc—cd and da. The bottom face of the sealing plate is flat and rests upon the flat top of the turret so as to maintain an air tight seal between the sealing plate and the turret, this so as to maintain an air tight seal between the sealing plate and the turret while permitting the turret to turn or move in its horizontal path as the machine functions.

The sealing plate has upwardly extending sections that fit the lower portion of the front hood so as to permit vertical movement as required while maintaining an air-tight seal between the sealing plate and the hood. In this connection an upstanding circular rib 35 has been provided which enters a recessed portion 39 in the front hood 30. The rib 35 has bored openings or cavities 36 within which there are received springs 37 (see Figs. 8 and 2) that continuously spring press in a downward direction the sealing plate 34 against the turret 4. The sealing plate 34 also serves as a seal or cover for the upper sides of pockets 3 as they enter and leave the vacuum chamber.

The wall blocks 31 serve as the side seals for the moving pockets 3 in turret 4. These blocks are hollow and have one curved surface to fit the outer face of turret 4 and rest on base plate 24 and against the vertically extending hood bearing strips 32. The wall blocks 31 are adjustable but held in position by bolts 38 so as to prevent an excessive drag on the outer face of moving turret 4 due to atmospheric pressure. It will be noticed also, that the hood 30 does not rest upon the moving turret 4 and thus produce a drag. The sealing piece 34, only, rests upon the turret 4. The sealing piece 34 is held in place by a recess 39 in the lower part of hood 30 into which the rib 35 of the sealing plate 34 enters (see Figs. 1, 2, 3, 4 and 8). This construction provides a tongue and groove arrangement which it will be noticed forms an air seal but allows plate 34 to move a limited distance only in a vertical direction, thus always resting upon turret 4 with a minimum of friction and automatically provides for any wear. The springs 37 continuously force the sealing plate 34 with a yielding press against the top face of the turret.

The hood bearing strips 32 are preferably welded to the main frame of the machine and form a smooth, air tight bearing surface for the vertical rear face of hood 30. The hood is secured in such a way that it may be removed and replaced with ease. The bearing strip 32 may be viewed as adapting strips and from an inspection of Figs. 12 and 12a it will be seen that they comprise a plate portion that provides a back leg 40 of the U-shaped section 41. This rear plate section 40 fills a gap between the frame member 20 and the curved top and rear side edges of the hood 30.

The revolving disc or pressure roller 17 is mounted on a movable support 42 and as previously indicated centers the cans against the back of pocket 3 for double-seaming. Also as previously stated the sides of pockets 3 are so shaped that the cans are centered in the cross direction as they are raised.

Also as previously stated the circular shaped strip 16 prevents the cans from moving out of pockets 3 by centrifugal force as they pass through the vacuum chamber. As the cans reach the position 90° from where they enter the pockets 3, they are raised by presser block 11 (see Fig. 1) at which time the can body comes in contact with its top, previously located as aforementioned, and in a position to be double-seamed by means of a set of revolving rollers 13 and 14 that operate about the periphery of the chuck 12 as shown in Fig. 1. Since the double seaming mechanism and operation is not part of this invention, it has not been described in detail.

It will be sufficient to state that the entire double-seaming means is enclosed in the vacuum chamber aforementioned, thus the cans and contents are under the influence of the vacuum chamber from the instant the carrying pockets 3 pass the inner edge of wall block 31 and until the seaming rollers seal the tops onto the cans.

As the double-seaming rollers finish the sealing of each can, the presser block 11 recedes to its former level with the can assisted by an intermittently acting push rod 15. The sealed cans then continue in their circular path past one of the wall blocks 31 on the outgoing side and emerge into the atmosphere as they come to a position 180° from point of entry into pockets 3. At this position the sealed cans drop by gravity to the lower receiving plate 18 and are pushed out by ejector arm 19, which passes under turret 4 previous to the dropping of each can as it emerges from the vacuum chamber.

Figure 11:
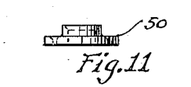
Fig. 11 is an elevational view of the gland used in the sealing cup of Fig. 9.

Base plate 24 forms the lower bearing for turret 4 and in effect is the base of the vacuum chamber. It is also provided with packing gland 50 (similar to that shown in Fig. 11) around turret shaft 10. Sealing box 51 forms an air tight housing around the pusher or presser block 11 and its controlling shaft 44. (See Fig. 1.) A packing gland as 50 enters the sealing box to effect a packing about the shaft 44. Likewise a packing gland as 50 is employed at the upper end of shaft 28, at the bearing 29 therefor and another packing gland is employed around the pusher rod 15 where it enters the upper portion of the frame of the machine.

As turret 4 passes in direction indicated by arrow A, lids are fed into pockets 3 from magazine 6. Occasionally, due to various causes, cans and lids become jammed and one or the other are missing in their proper place for sealing. Therefore, guards 53 and 55 are placed at both lid feeder and can feeder entrances.

First, lids are fed into U-irons 7 in pocket 3 directly in front of lid feeder 6. Pocket 3 with lid passes around to location directly in front of can feeder 5. Feeder 5 pushes filled can into pocket 3, under lid just mentioned. Feeder 5 and ejector 19 are secured to sliding member 52 by which both feeder and ejecting are done by one motion.

If, due to some mechanical trouble, a can on the exhaust side has not been discharged, pusher 5 is prevented from feeding a new can into this already filled pocket by the action of guard 53 shown in Figure 5.

Guard arm 53 is pivoted to bracket 59 at 60. Link 61 is rigidly affixed to guard arm 53 at the point of pivot and pivots therewith. Link 56 is pivoted to link 61 at 62 and is provided at the non-pivoted end with goose neck rod 63 pivotally connected to bar 64 at 70 shown in Figure 14. Bar 64 is pivoted on bracket 65 at 71. Coil spring 66 is attached to bracket arm 67 at 68 and to rod 72 at 73. Arm 72 is rigidly affixed to bar 64 at 74. The extent of movement of bar 64 is limited by slot 69.

Figure 14 discloses in solid line the position of bar 64 guarding the end of opening 75, which is the position of bar 64 when lip 54 has entered pocket 3 by reason of the absence of a lid. If a lid is present in pocket 3, as will be more clearly understood from the description which follows, bar 64 assumes the dotted line position of Figure 13 out of registry with opening 75, thus permitting the end of rod 58 to pass through opening 75, as will be more particularly described hereinafter. It will be readily understood that the linkage mechanism may be arranged with opening 75 either above or below the pivot 71 by simple, well understood mechanical expedients.

It will be seen, therefore, that when lip 54 is riding on the outer periphery of turret 4 between the pockets and when a can is in a pocket passing lip 54, lip 54 and arm 53 are maintained in the same position as shown in Figure 5. In the event, which of course is the usual case, there is no can in pocket 3, when pocket 3 passes lip 54, lip 54 will be permitted to enter the pocket due to the action of coil spring 66 translated through the linkage mechanism comprising block 64 pivoted at 71, goose neck 63, link 56 and link 61.

In the normal operation of the machine, this movement of the linkage mechanism just described occurs each time a pocket passes lip 54. It will be seen that this movement of the linkage mechanism removes block 64 from registry with the end of opening 75 through which rod 58 passes. Spring 57 attached to the frame at 76 and to rod 77 at 78 tends always to urge rod 58 and can feeding control assembly 79 forwardly toward the front of the machine. That portion of the machine to which the hood 30 is applied is considered the front of the machine and the portion to which the door 45 is applied is termed the back of the machine. In the event that the can is in pocket 3 when pocket 3 passes lip 54, block 64 remains over the end of opening 75 and thus prevents rod 58 from being pulled forwardly by spring 57. Since the can feeding assembly 79 is thus controlled by the motion of rod 58, if a can is in pocket 3 when it passes lip 54, the can feeding assembly does not pass a can from conveyor 1 to feeding platform 80.

Guard 55, as shown in Figure 5, is provided to control the feeding of lids into the turret substantially in the manner in which guard 53 controls the feeding of can bodies into the turret. It is deemed unnecessary to describe this linkage mechanism in detail since various linkage mechanisms may be devised to perform this function.

I desire, however, to point out that one aspect of my invention contemplates the control of the feeding of can lids whereby if a lid becomes jammed in a pocket or a can for some reason fails to discharge on discharge platform 18, lid feeding mechanism 6 will fail to feed a lid into the occupied pocket. The control of the linkage mechanism operating lid feeding mechanism 6 is secured through guard 55 riding on the outer periphery of the turret near the top at the point adjacent the lid position so that if a lid occupies the pocket, guard 55 does not move and the failure of guard 55 to move causes the failure of lid feeding mechanism 6 to feed a lid into the pocket when the pocket assumes the position opposite lid feeding mechanism 6.

In the normal operation of the machine it will be seen that guard 55 appropriately urged by proper spring means will enter pocket 3, this motion being translated through arm 81 and an appropriate linkage mechanism not shown, causing lid feeding mechanism 6 to feed a lid into pocket 3.

As previously indicated, the rear of the vacuum chamber is enclosed by the door or rear hood 45 resting on a smooth angle iron frame 46. A glass covered opening 47 in door 45 permits a full view of the vacuum chamber and its working parts at all times. The door 45 is easily removed for access to the vacuum chamber, as is also true of the hood 30.

Air is exhausted from the vacuum chamber by means of pipe 48 and the degree of vacuum may be controlled as desired. A vacuum gage 49 is also provided. On account of the large vacuum chamber and the relatively small volume of air entering with each can in the small pockets 3 of turret 4, the degree of vacuum exerted on each can and its contents is almost perfectly constant.

It will be seen that the net result of converting of the non-vacuum type of machine into a vacuum type of machine is a new machine and the invention from one aspect relates to such new machine.

The advantages of these above described improvements are as follows:

The manufacture of the can covers is simplified, since no vent hole is required in same and no provision for the escape of air or means of soldering is necessary.

The so-called "cleats" or "bridges" used in connection with each cover and necessary with the class of product mentioned above are not required with these improvements.

The elimination of a separate vacuum sealing machine with the saving of sealing solder and labor connected therewith.

The elimination of large cooling tanks and cost of operating same, which are required with certain products, by the vent-hole soldering method.

The advantage of being able to seal cans while the contents are at any desired temperature.

The advantage of extracting air from cans and their contents while the cover is entirely separate therefrom, thus affording a free and quick exit for the air before closing the cover.

The advantage of a minimum and greatly reduced time between the filling of the cans and their seal under vacuum, which is an essential factor in connection with meat products.

The advantage of a short, uninterrupted travel of the canned product from the filler to the cooker through only one machine to perform all necessary operations.

Having now particularly described and ascertained the nature of my invention and the manner in which it performs, which I claim as new and desire to secure by Letters Patent is:—

1. In a can sealing machine wherein there is a base plate, a main frame comprising a transverse top section and upstanding side members to which the base plate is connected, a revolvable turret with can receiving openings, which turret is mounted on said base plate and has a driving shaft therefor that extends downwardly through the base plate, can seaming mechanism having operative seaming elements positioned above the turret, a pusher that is operable through the base plate and which is located below the seaming mechanism for pushing a can, with top member thereupon, upwardly while within a can receiving pocket of the turret to and under the operative influence of said seaming mechanism, an operative shaft for said pusher, a main drive shaft that extends upwardly through the base plate and that has a bearing therefor in the upper portion of the frame and carrying gearing whereby operating power is transmitted from said shaft to the seaming mechanism, and in combination with the several parts specified means for providing an air-tight packing between the base plate and the driving shaft for the turret, means between the operating shaft for the pusher and the base plate for providing an air-tight construction as between the pusher on the one hand and the base plate on the other, means for providing an air-tight seal between the base plate and a lower portion of the main drive shaft, means for providing an air-tight construction between the upper portion of the main drive shaft and the bearing therefor, a rear hood completely enclosing the rear section of the machine and extending from a transverse top section of the main frame to the base plate and from one side frame member to the other side frame member, a front hood that extends from one side frame member to the other side frame member and that extends from the upper transverse section of the frame downwardly towards but not quite in engagement with the top face of the turret, a sealing plate between the lower end of the front hood and the top face of the turret, which sealing plate is constructed so that the bottom face thereof provides an air-tight seal with the top face of the turret, said sealing plate having an upstanding portion that cooperatively engages a corresponding portion in the lower end of the front hood whereby an air-tight seal is maintained as between the front hood and the sealing plate but which permits slight vertical adjustment of the sealing plate relative to the front hood, said machine also having side bearing or wall blocks that rest upon the base plate and which extend from the periphery of the turret to the side frame members of the machine, and to and upon which bearing blocks the lower ends of the side portions of the front hood rest, said wall blocks each having a face section with curved contour that fits the vertical curved contour of the turret periphery and which curved face section is of sufficient length to completely space the outer ends of the sections providing the can receiving opening, the turret construction, the sealing plate associated therewith, the wall plates, and the several parts mentioned being arranged so as to provide a maintained vacuum chamber whereby a can placed within one of the can receiving pockets of the turret can be moved by one of the wall blocks and be passed into the vacuum chamber provided within the machine, so that a seaming operation can be carried out under vacuum within the machine and so that the can after being seamed can be moved by the other wall block and be passed from the machine without any substantial loss of the vacuum.

2. A machine as defined in and by claim 1, according to which there is provided an ejector rod which enters the machine through a passageway otherwise sealed and which ejector or push rod is arranged over the pusher previously mentioned and in respect to the can sealing mechanism in such a maner that the ejector rod can serve to press downwardly a can which has been seamed whereby the can will ultimately be properly delivered from the machine.

3. In combination in a can sealing machine, a base plate, frame members extending upwardly therefrom and connected thereto, a revolvable turret with can receiving openings, which turret is mounted on said base plate and has a driving shaft therefor that extends downwardly through the base plate, can seaming mechanism having operative seaming elements positioned above the turret, a pusher that is operable through the base plate and which is located below the seaming mechanism and which is arranged for pushing a can as brought thereover upwardly into engagement with a can top and thereby upwardly to and under the operative influence of said seaming mechanism, an operative shaft for said pusher, a main drive shaft that extends upwardly through the base plate and that has a bearing for the upper end thereof in the frame and which drives gearing whereby operating power is transmitted therefrom to the operative members of the seaming mechanism, means for providing an air-tight packing between the base plate and the shaft driving the turret, means between the operative shaft for the pusher and the base plate for providing an air-tight construction as between the pusher mechanism on the one hand and the base plate on the other, means for providing an air-tight seal as between the base plate and a lower portion of the main drive shaft, means for providing an air-tight seal as between the upper portion of the main drive shaft and the bearing therefor, a rear hood completely enclosing the rear section of the machine from the top of the main frame to the base plate and from side to side of the main frame, a front hood that extends from side to side of the main frame and that extends from the top of the frame downwardly towards but not quite in engagement with the top face of the turret, a sealing plate between the lower end of the front hood and the top face of the turret, which sealing plate is constructed so that the bottom face thereof provides an air-tight seal with the flat top face of the turret, said sealing plate having an upstanding rib portion that cooperatively engages a corresponding recessed portion in the lower end of the front hood whereby an air-tight seal is maintained as between the front hood and the sealing plate but which permits slight vertical adjustment of the sealing plate relative to the front hood; said machine also having at each side thereof a side wall block that rests upon but that is detachably secured to the base plate, and that extends from the turret to the corresponding side of the frame of the machine, and to and upon which the lower end of a corresponding side of the front hood rests, each said wall block having a curved contour that fits the vertical curved contour of the turret and which curved contour of the side wall blocks has sufficient length to completely span the outer ends of each can receiving pocket as the pocket passes the wall block.

4. A machine as defined in and by claim 3, according to which there is provided a vertically movable ejector rod which enters the machine through a passageway otherwise sealed and extends downwardly through the chuck of the seaming mechanism and which is operated in such a manner that it can serve to press downwardly against a can which has been seamed to insure a proper dropping of the can preparatory to ultimate delivery thereof by the turret from the machine.

5. A machine as defined in and by claim 3, in which the front hood is detachably secured in place to and upon adapter plate members that are most permanently secured to the main frame of the machine, and which adapter plate members when in place also provide the side portions of the machine frame to which the wall blocks extend.

6. A vacuum type can seamer, comprising a base, a revolving turret having can receiving openings and operative through said base, a hood having a recessed lower portion, a segmental sealing plate adapted to rest upon the top face of said turret, said segmental plate being of sufficient size to cover a plurality of said can receiving openings in said turret, and a rib member rigidly secured to said segmental plate to fit within said recessed lower portion of said hood which rib member is free to move within the recessed portion when the device is in operation.

7. A vacuum type can seamer, comprising a base, a revolving turret having can receiving openings and operative through said base, a hood having a recessed lower portion, a segmental sealing plate adapted to rest upon the top face of said turret, said segmental plate being of sufficient size to cover a plurality of said can receiving openings in said turret, a rib member rigidly secured to said segmental plate to fit within said recessed portion of said hood which rib member is free to move within said recessed lower portion of said hood when the device is in operation and side sealing plates of a height corresponding to the height of the turret and cooperative therewith.

8. A vacuum type can seamer, comprising a base, a revolving turret having can receiving openings and operative through said base, a hood having a recessed lower portion, a segmental sealing plate adapted to rest upon the top face of said turret, a rib member rigidly secured to said segmental plate to fit within said recessed lower portion of said hood, said rib having a series of spring receiving openings, which rib member is free to move within the said recessed lower portion of said hood when the device is in operation, and a coil spring in each of the openings in said rib to hold said segmental plate in engagement with the turret.

9. In a vacuum type seamer having a base and revolving turret, a hood having a recessed lower portion, a segmental sealing plate adapted to rest upon the top face of said turret, and a rib member rigidly secured to said plate to fit within said recessed portion of said hood, which rib member is free to move within the recessed portion when the device is in operation.

10. In a vacuum type can seamer, a base, revolving turret, a hood having a recessed lower portion, a segmental sealing plate adapted to rest upon the top face of said turret, and a rib member rigidly secured to said plate to fit within said recessed portion of said hood and having a series of spring receiving openings, which rib member is free to move within the recessed portion when the device is in operation and a coil spring in each of said openings to hold said sealing plate in engagement with said turret.

11. A vacuum type seamer comprising a base, a revolving turret having can receiving openings and operative through said base, can closing mechanism operable with said turret and a chamber arranged to form an air-tight enclosure relative to the stationary and movable parts of said can closing mechanism and a sector of said turret, said chamber including a hood provided with a segmental plate adapted to rest upon the top face of said turret, said plate being movable relative to said hood when the device is in operation, and means for exhausting the air from said chamber, said chamber being so arranged that the cans carried in said can receiving openings will be submitted to a vacuum during the sealing operation.

12. A vacuum type seamer comprising a base, a revolving turret having can receiving openings and operative through said base, can closing mechanism operable with said turret and a chamber arranged to form an air-tight enclosure relative to the stationary and movable parts of said can closing mechanism and a sector of said turret, said chamber including side seals having a segmental curved surface fitting the side walls of said revolving turret and a hood provided with a segmental plate adapted to rest upon the top face of said turret, said plate being movable relative to said hood when the device is in operation, and means for exhausting the air from said chamber, said chamber being so arranged that the cans carried in said can receiving openings will be submitted to a vacuum during the sealing operation.

13. A vacuum type can seamer, comprising a base, a revolving turret having can receiving openings and operative through said base, a vacuum chamber including side seals having segmental curved surfaces fitting the side walls of said turret and a detachable hood having a recessed lower portion, a segmental sealing plate adapted to rest upon the top face of said turret, said segmental plate being of sufficient size to cover a plurality of said can receiving openings in said turret, and a rib member rigidly secured to said segmental plate to fit within said recessed lower portion of said hood, which rib member is free to move within the recessed portion when the device is in operation.

14. In a vacuum type can seamer having a base and revolving turret, a vacuum chamber including side seals having segmental curved surfaces fitting the side walls of said turret, and a detachable hood having a recessed lower portion, a segmental sealing plate adapted to rest upon the top face of said turret, and a rib member rigidly secured to said plate to fit within said recessed portion of said hood, which rib member is free to move within the recessed portion when the device is in operation.

15. In a vacuum type can seamer having a base and revolving turret, a detachable hood having a recessed lower portion, a segmental sealing plate adapted to rest upon the top face of said turret, and a rib member rigidly secured to said plate to fit within said recessed portion of said hood, which rib member is free to move within the recessed portion when the device is in operation.

16. In a vacuum type can seamer, a base, a revolving turret, a detachable hood having a recessed lower portion, a segmental sealing plate adapted to rest upon the top face of said turret, and a rib member rigidly secured to said plate to fit within said recessed portion of said hood and having a series of spring receiving openings, which rib member is free to move within the recessed portion when the device is in operation and a coil spring in each of said openings to hold said sealing plate in engagement with said turret.

CHARLES EARL MALLORY.

CERTIFICATE OF CORRECTION.

Patent No. 2,047,423.　　　　　　　　　　　　　　　　July 14, 1936

CHARLES EARL MALLORY.

It is hereby certified that error appears in the printed specification of the above numbered patent requiring correction as follows:- Page 5, first column, line 5, for the word "feeder" read feeding; page 7, first column, line 68, claim 9, before "seamer" insert can; and that the said Letters Patent should be read with these corrections therein that the same may conform to the record of the case in the Patent Office.

Signed and sealed this 15th day of September, A. D. 1936.

(Seal)　　　　　　　　　　　　　　　　　　　　　　　Henry Van Arsdale
　　　　　　　　　　　　　　　　　　　　　Acting Commissioner of Patents.